March 25, 1969     G. CERUTTI ET AL     3,434,180
APPARATUS FOR MELTING SYNTHETIC LINEAR POLYMERS AND
FEEDING THEM TO A SPINNERET
Filed Jan. 9, 1967
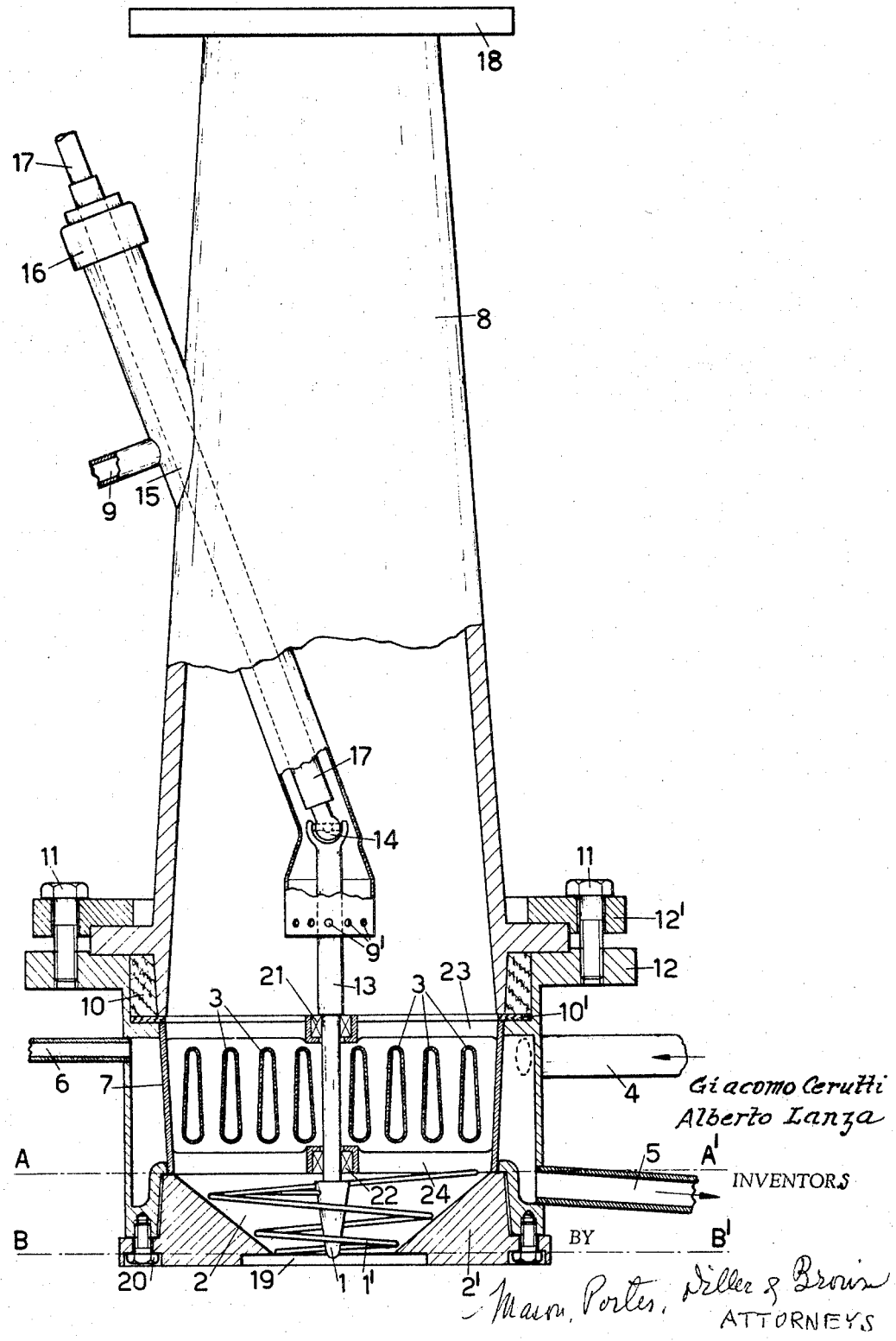
INVENTORS
Giacomo Cerutti
Alberto Lanza
BY Mason, Porter, Diller & Brown
ATTORNEYS United States Patent Office 3,434,180
Patented Mar. 25, 1969

3,434,180
APPARATUS FOR MELTING SYNTHETIC
LINEAR POLYMERS AND FEEDING THEM
TO A SPINNERET
Giacomo Cerutti and Alberto Lanza, Gozzano, Italy, assignors to Bemberg S.p.A., Milan, Italy, an Italian company
Filed Jan. 9, 1967, Ser. No. 608,083
Claims priority, application Italy, Jan. 19, 1966, 13,598/66
Int. Cl. D01b 1/04, 5/10
U.S. Cl. 18—8        6 Claims

ABSTRACT OF THE DISCLOSURE

An apparatus for melting synthetic linear polymers and feeding them to a spinneret is provided with an agitator in the collecting chamber below the melting grid for preventing the molten material from sticking to the wall of said chamber.

---

This invention relates to a device for melting and feeding into a spinneret synthetic linear polymers, more particularly polyethylene terephthalate granules, wherein said granules are fed through a vertical downfall pipe into a melting grid, formed by one or more heated grid bars and by a heated grid wall, contacting which said granules melt and wherein the melted polymer subsequently flows into a collecting chamber having a frustoconical configuration and placed beneath the grid bars, from which the melted polymer is drawn by gear pumps and extruded through the orifices of a spinneret so as to be converted into filaments or webs.

Said device and process are conventional. When carrying out the known procedure, the melting grid is heated to a temperature above the melting point of polyethylene terephthalate, either by electric means, or by circulating high-boiling liquids or vapours within the grid bars and walls, the latter procedure being generally preferred.

In the conventional process, the granulated material begins to melt as it contacts the upper portion of the bars of the grid, then becoming completely melted and flowing into a collecting chamber, wherefrom it is drawn by the gear pumps to be extruded.

In order to encourage the flow of the melted material, the collecting chamber has, in general, the shape of a frustum of cone, that is, it is funnel-shaped.

However, a few drawbacks have been detected heretofore in melt-spinning polyethylene terephthalate granules with the conventional procedures and machines.

It would appear that this fact should be attributed to the reason that the melted polymer which flows into the collecting chamber beneath the grid bar(s) does not have a homogeneous composition as it is being drawn by the gear pumps.

As a matter of fact, the melted polymer is highly viscous and its downward flow towards the collecting chamber takes place at different speeds at the several points of an ideal horizontal cross-section of said chamber. Especially along the area of contact with the sloping wall of the collecting chamber, the flow of the melted mass is slowed to such an extent that stagnation pockets tend to be formed. In the stagnation pockets the polymer becomes rapidly degraded due to overheating.

It is known, indeed, the polyethylene terephthalate is poorly stable at temperature above its melting point and that degradations of the molecular weight come into being after a short time at such temperatures.

Upon being drawn by the gear pumps, the melted polymer composition is no longer so homogeneous due to the presence of a degraded polymer fraction.

This phenomenon is a serious drawback which is reflected on all the subsequent working steps and on the specifications of the ultimate product as well. Thus, for example, during the production of filaments, frequent interruptions of spinning are experienced, along with a high number of breaks during hot-drawing of the filaments, an overly high fluffiness of the thread, unsatisfactory textile characteristics and so forth, the above indicated phenomenon being particularly troublesome when polyethylene terephthalate is involved.

It has now been ascertained that said drawback can be nearly entirely overcome by subjecting the melted polymer in the collection chamber to a downward whirling motion.

As a matter of fact, the novel procedure entails no more stagnation pockets of polymer along the area of contact with the sloping wall of the collection chamber, inasmuch as the molten mass goes down with a whirling motion which causes a stirring up of the molten mass. The latter has thus, now, an even composition, and is exempt from any degraded polymer fractions as it is being drawn by the gear pumps.

The device adapted to put the inventive process into practice comprises a vertical dropping tube, a melting grid formed by one or more heated grid bars and a heated grid wall, and a collecting chamber for the melted polymer placed beneath the grid bars and having a frustoconical configuration, and is characterized in that there is housed in the collecting chamber a stirrer consisting of a central shaft coaxial with the collecting chamber and a helical spiral affixed by means of spokes to said central shaft, the spirals of said helix having gradually decreasing mean diameters from top to bottom, thus following the shape of the collecting chamber.

The particular shape of said stirrer imparts to the molten mass a downward rotary whirling motion. In order that the rotary whirling motion towards the bottom may involve the molten mass in the collection chamber in its entirety, with particular regard to the sloping sidewalls thereof, the spirals of the helix of the stirrer should be located in an area which is adjacent to the area of contact of the molten mass with the wall of the collecting chamber.

Such a task is fulfilled when the helical spiral of the stirrer is inscribed within a frustoconical volume which is at least 80% of the overall volume of the collecting chamber.

Also the shape of the central shaft of the stirrer contributes towards the obtention of the downwardly directed whirling motion of the molten mass. The best results, it has been ascertained, are obtained by a downwardly tapering shape having a circular cross-section and a bulk ranging from one eighth to one twelfth of the overall volume of the collecting chamber.

A certain speed of rotation of the helical stirrer is required in order to create the downward whirling motion of the molten mass within the collecting chamber. It has been found that useful results are achieved with a speed of at least 3 r.p.m., and preferably more. Understandably, the rotational speed of the stirrer cannot be raised too much since the upper edge of the whirl induced in the molten mass would tend to rise above the lower edge of the grid bar(s), the result being an upward shift of the transition surface between the still solid granules (or semi-solid granules) and the molten mass. This fact could be conducive to drawbacks of various nature and should thus be avoided. The upper limit of the speed of rotation of the stirrer should thus be selected, in each particular case, consistently with the size of the grid and the collecting chamber, as well as the viscosity of the molten mass. It is preferred that said upper limit does not exceed 50 r.p.m.

The stirrer-driving motor is preferably installed outside the device proper. To this end, the stirrer shaft has a slanting extension connected by a universal joint placed above the granule melting area and outside the vertical dropping tube.

In order that the invention shall be more clearly illustrated, reference will be now had to the accompanying drawing which illustrates, by way of example only, an embodiment of the inventive device in vertical cross-sectional view.

The device shown in the drawing comprises a dropping conduit 8 which can be connected, in its top portion, by a flange 18 to a reservoir containing the material to be melted, for example granules of polyethylene terephthalate. To the bottom portion of said conduit an annular body 7 is affixed, by means of bolts 11 and the flanges 12 and 12′, a gasket 10′ and a packing 10 of a heat-insulating material being inserted therebetween.

The annular wall of the body 7 is hollow and carries the hollow bars 3, whose cavities communicate with the cavity of the body 7, partitioned by two diaphragms into two compartments, one of which is in communication with a pipe 4 for feeding in a heating fluid, the other one communicating with the drainpipe 5 for said fluid, so that said fluid is forced to pass through the bars 3 and serves to heat them.

A pipe 6 is provided to discharge from the cavity of the body 7 the gases possibly evolved therein and which cannot be condensed.

Beneath the annular body 7 is affixed, by bolts 20, the member 2′ which encloses a collecting chamber 2 having an inverted frustoconical shape.

Within the chamber 2 there is a rotary stirrer 1′ formed, for example, by a metal strip connected by spokes to the central shaft 1, the latter having a tapered shape and being affixed to a mainshaft 13 journaled in bearing 21 and 22 borne by the girders 23 and 24 supported by the annular body 7.

The spiral 1′ follows very closely the trend of the frustoconical surface of the chamber 2. To the shaft 13 is connected, via the universal joint 14, a sloping shaft 17 which is housed, together with the joint 14 and the top portion of the shaft 13, within a tube 15 jutting out of the conduit 8.

At the top, between the pipe 15 and the shaft 17, is inserted a conventional sealtight member 16, and a fitting 9 is connected to the pipe 15 through which an inert gas can be fed into said tube and, through the perforations 9′ at the bottom thereof, into the duct 8.

The shaft 17 is driven, either directly or indirectly, by any prime mover (not shown) at a speed in the order of, say, 6 r.p.m.

By pouring the material to be melted into the device or apparatus described above, the material drops along the duct 8, until as blanketed by the inert gas atmosphere, it comes into contact with the heated grid and is passed in the molten state into the collecting chamber 2. Here, it is kept under moderate stirring by the spiral 1′ which prevents it from stagnating, any degradation danger being thus so prevented, and is then passed into a pump assembly connected to the member 2′ in the cavity 19 and which is not shown herein since it is not essential to a proper understanding of the present invention.

By utilizing the device or apparatus described above for melt spinning polyethylene terephthalate granules, it has been ascertained that spinning proceeds without stoppages for a long period of time. Upon stripping the device and opening the grid, no trace of degraded polymer was found in the collecting chamber, the quality of the filaments being also considerably improved.

The foregoing description was given with reference to polyethylene terephthalate. However, the inventive device and method can be advantageously used also in connection with other synthetic linear polymers, such as polyamides, polyurethanes and polyesters, different from polyethylene terephthalate.

What is claimed is:

1. Apparatus for receiving, melting, stirring and delivering toward a spinneret substances such as granulated polyethylene terephthalate, said apparatus comprising a vertical dropping tube, a melting grid consisting of one or more heated grid bars and a heated grid wall, a collecting chamber for the molten polymer placed beneath said grid bars and having an inverted frustoconical configuration, said collecting chamber housing a stirrer consisting of a central shaft, coaxial with said collecting chamber, and of a spiral strip solidly affixed to said central shaft by means of spokes, said spiral strip having decreasing diameters from top to bottom and conforming to the outline of said collecting chamber, said stirrer being mounted on a shaft which is extended obliquely by a universal joint placed above the granule-melting area and outside the granule-dropping tube.

2. Apparatus according to claim 1, characterized in that said spiral strip of the stirrer is inscribed within a frustoconical volume which is at least 80% of the overall volume of said collecting chamber.

3. Apparatus according to claim 1, characterized in that said central shaft of the stirrer has a downwardly tapering outline and circular cross-sectional shape, and has a bulk comprised between ⅛ and 1/12 of the overall volume of the collecting chamber.

4. Apparatus according to claim 1, characterized in that the speed of rotation of the helical stirrer is at least three revolutions per minute.

5. Apparatus according to claim 1 characterized in that the obliquely extended part of the shaft and the universal joint are encased within a tube opening at its lower end into the interior of the dropping tube, there also being included means for delivering an inert gas into the shaft encasing tube.

6. Apparatus according to claim 5 wherein the shaft encasing tube has an enlargement at its lower end disposed beneath the universal joint and the delivery of inert gas being from said enlargement through radially outwardly opening apertures.

References Cited

UNITED STATES PATENTS 3,010,147 11/1961 Davies et al.
3,036,334 5/1962 Hayden.
3,180,630 4/1965 Endres et al.

FOREIGN PATENTS 1,059,611 6/1959 Germany.

WILLIAM J. STEPHENSON, *Primary Examiner.*